United States Patent [19]

McAlister

[11] 4,371,326
[45] Feb. 1, 1983

[54] APPARATUS FOR MAKING PLASTIC SOLAR PANEL STRUCTURE

[76] Inventor: Roy E. McAlister, 5285 Red Rock North, Phoenix, Ariz. 85018

[21] Appl. No.: 213,200

[22] Filed: Dec. 4, 1980

Related U.S. Application Data

[62] Division of Ser. No. 6,754, Jan. 26, 1979, Pat. No. 4,271,103.

[51] Int. Cl.³ .............................................. B29C 17/07
[52] U.S. Cl. ....................................... 425/71; 156/244; 156/244.14; 156/500; 425/72 R; 425/131.1; 425/133.1; 425/192 R; 425/194; 425/326.1; 425/463; 425/464
[58] Field of Search ............... 425/131.1, 133.1; 264/558, 564, 561–563, 565, 568, 566, 209.4, 177 R; 427/160, 162, 167, 211, 428; 126/445, 448, 449, 452, 901; 156/244.13, 244.14, 500

[56] References Cited

U.S. PATENT DOCUMENTS

| | | | |
|---|---|---|---|
| 3,038,201 | 6/1962 | Harkenrider | 425/192 R |
| 3,274,315 | 9/1966 | Kawamura | 264/563 |
| 3,520,963 | 7/1970 | Allseits et al. | 264/209.4 |
| 3,530,535 | 9/1970 | Sachs | 425/192 R |
| 3,668,288 | 6/1972 | Takahashi | 425/72 R |
| 3,792,951 | 2/1974 | Meyers | 425/326.1 |
| 3,812,230 | 5/1974 | Takahashi | 264/568 |
| 3,825,641 | 7/1974 | Barnett | 264/565 |
| 3,946,918 | 3/1976 | Babbin et al. | 425/325 |
| 4,113,411 | 9/1978 | Terragni | 425/325 |
| 4,181,487 | 1/1980 | Kessler | 425/326.1 |

FOREIGN PATENT DOCUMENTS

| | | | |
|---|---|---|---|
| 2152060 | 4/1972 | Fed. Rep. of Germany | 425/72 R |
| 2213847 | 9/1974 | France | 425/72 R |
| 48-18577 | 6/1973 | Japan | 264/566 |
| 50-30679 | 10/1975 | Japan | 264/564 |

Primary Examiner—Jeffery R. Thurlow
Attorney, Agent, or Firm—Cushman, Darby & Cushman

[57] ABSTRACT

A method and apparatus for extruding a radiant energy heat exchanging panel structure having a multiplicity of parallel passages extending longitudinally therethrough defined by a multiplicity of longitudinally extending integrally interconnected exterior and interior thin wall sections, in which the temperature of the plastic material moving longitudinally away from the extrusion outlet is reduced by flowing fluid into said passages and on the exterior sides thereof, by contacting the exterior sides with pairs of cooled rollers, by rolling a liquid medium upon the operative exterior side, and by flowing a liquid spray thereon to provide a radiation absorbing coating on the exterior side of the panel structure opposite from the operative side thereof. Certain of the flowing fluids are reactant fluids which chemically react with the hot plastic material or condense thereupon to form molecular coatings thereon enhancing the properties thereof as a panel structure.

18 Claims, 10 Drawing Figures

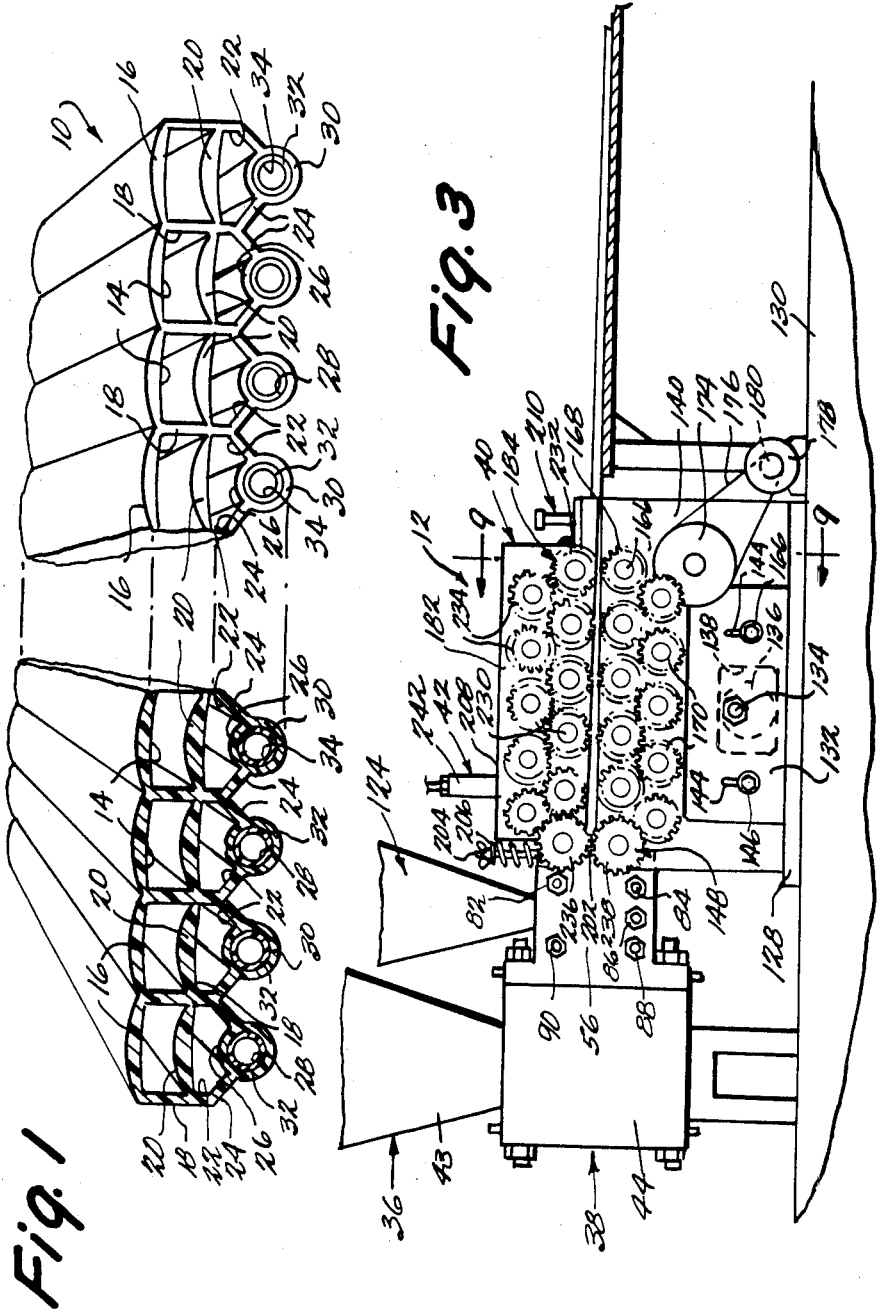

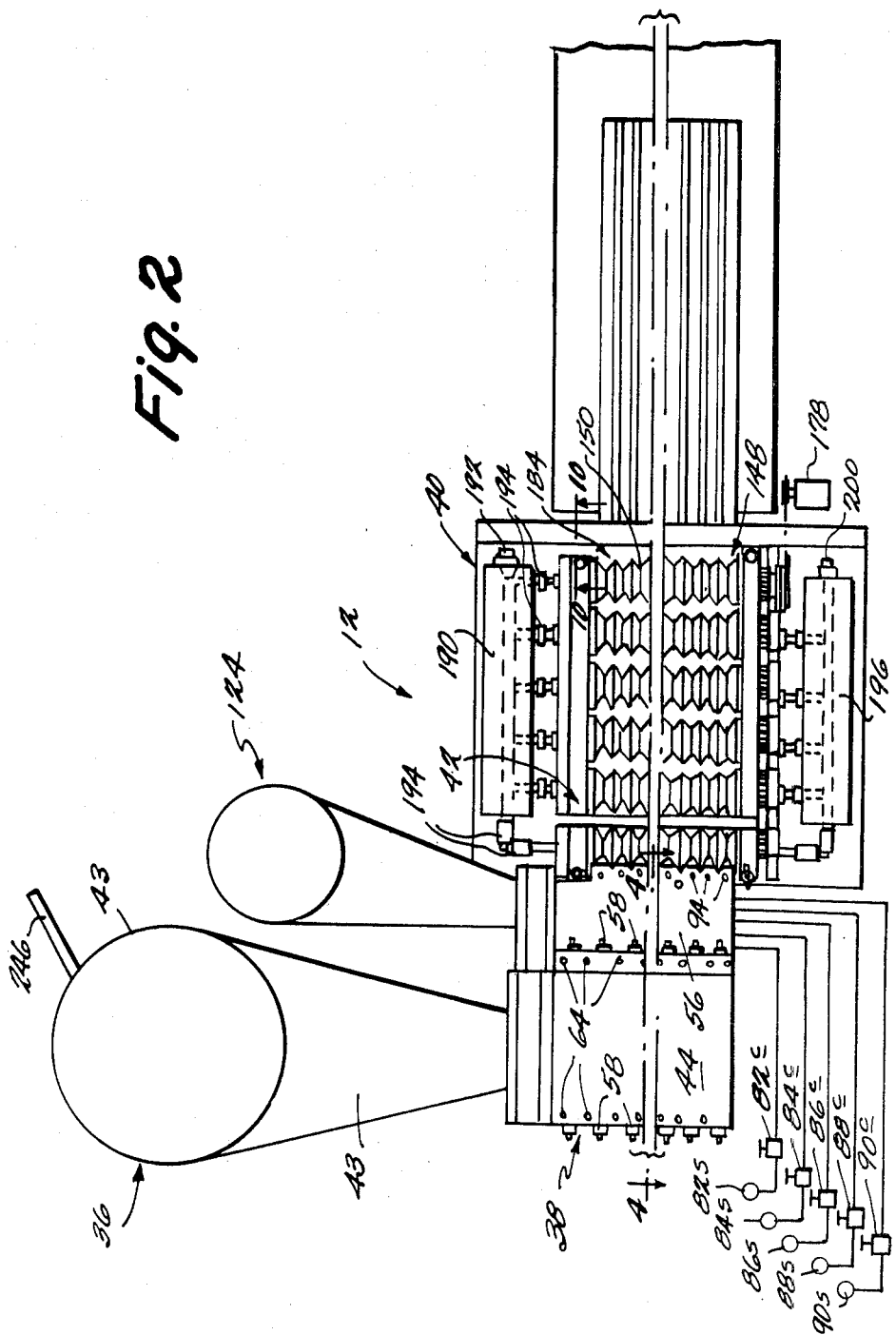

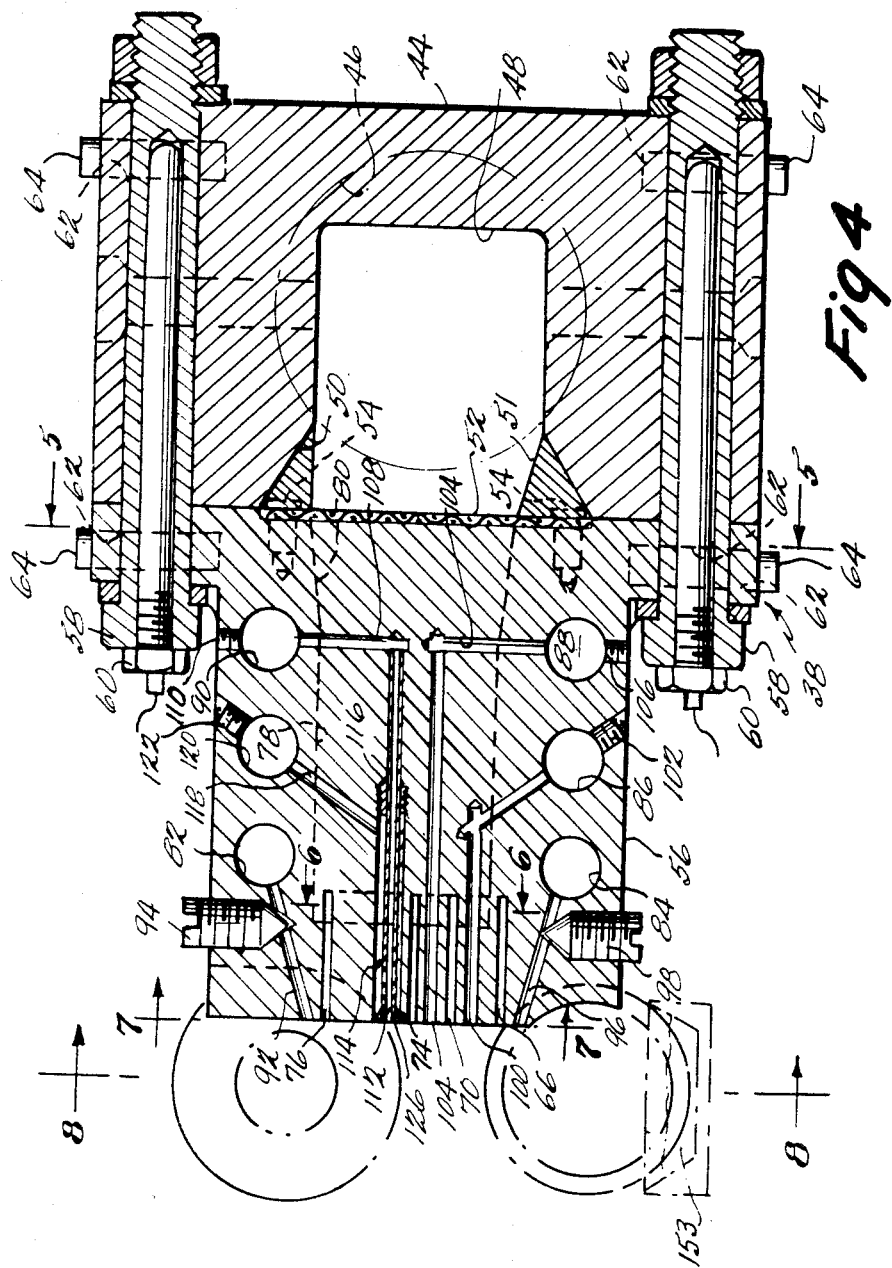

APPARATUS FOR MAKING PLASTIC SOLAR PANEL STRUCTURE

This application is a division of application Ser. No. 6,754, filed Jan. 26, 1979, now U.S. Pat. No. 4,271,103 issued on June 2, 1981.

This invention relates to solar energy and more particularly to an improved radiant energy heat exchanger panel suitable for use in a solar energy system and a method and apparatus for making the same.

The present invention contemplates radiant energy heat exchanger panels of the type described in my copending application Ser. No. 860,779, filed Dec. 15, 1977, now abandoned in favor of continuation application Ser. No. 98,814 filed Nov. 30, 1979, now U.S. Pat. No. 4,279,244 issued July 21, 1981. The invention is particularly concerned with the method and apparatus for manufacturing the panel structure of plastic material and with the resultant functional and physical characteristics of the panel structure when used in a radiant energy heat exchanger system.

The panel structure herein contemplated has a uniform cross-sectional configuration throughout its longitudinal extent and a multiplicity of parallel passages extending longitudinally therethrough defined by a multiplicity of longitudinally extending integrally interconnected exterior and interior thin wall sections. Each of the interior thin wall sections defines parts of two adjacent passages. Each of the passages is defined at least in part by an interior thin wall section.

A panel structure of uniform cross-sectional configuration throughout its longitudinal extent constitutes a structure which can most economically be formed by an extrusion process. However, the existence of the interior thin wall sections provides certain difficulties in the performance of the extrusion process. The basic difficulty is in cooling the interior thin wall sections after they leave the die outlet and in controlling their configuration until they can be cooled enough to render them self-sustaining.

An object of the present invention is to provide a method and apparatus for making a panel structure of plastic material of the type described which provides for the extrusion of the plastic material and the cooling of the plastic material to a temperature sufficient to render the thin wall sections self-sustaining wherein configuration control and temperature reduction are provided both externally and internally as the plastic material moves longitudinally away from the die outlet. In accordance with the principles of the present invention, this objective is obtained by the provision of a process in which the plastic material is continuously fed at an elevated temperature sufficient to render it flowable and at a pressure sufficient to cause it to continuously move outwardly of an extrusion outlet of the extrusion die. The temperature of the plastic material defining the exterior thin wall sections of the panel structure moving longitudinally away from the extrusion outlet is reduced by exterior heat exchange while the exterior configuration is controlled for a time sufficient to enable the moving exterior thin wall sections to be self-sustaining in the controlled configuration. Simultaneously fluids, i.e. gases, vapors or liquids, are suitably fed through fluid outlets in the die so as to flow longitudinally outwardly into each passage defined by the thin wall sections moving outwardly from the extrusion outlet. The relative fluid pressures acting within adjacent passages on opposite sides of the interior thin wall sections are controlled so as to control the position and hence configuration of the interior thin wall sections relative to the exterior thin wall sections until the temperature thereof is reduced by heat exchange with the fluid and surroundings sufficient to enable the moving interior thin wall sections to be selfsustaining.

The temperature reduction and configuration control of the exterior thin wall sections is achieved first by contacting the exterior surfaces of the exterior thin wall sections with spaced pairs of cooperating cooled rollers having profile configurations corresponding to the desired exterior profile configuration of the panel structure. Secondarily, a gaseous or vapor or liquid cooling medium is directed onto both the top and bottom exterior surfaces of the panel through suitable fluid outlets in the extrusion die. The exterior cooling contemplates a third procedure, namely, the application of liquid spray coolants and coatings to the exterior surfaces of the panel including the exterior surfaces which are presented to the sun as well as the opposite exterior surfaces.

By utilizing the procedures enunciated above, it becomes possible to build into the resulting panel structure certain highly desirable physical and functional characteristics without the necessity of performing additional subsequent fabricating steps. First, it becomes possible to accurately control the thickness of the thin wall sections and to achieve minimization of such thickness thorugh configuration control following the movement of the heated plastic material longitudinally outwardly of the extrusion outlet of the die. For example, the ability to provide configuration control enables the formation of concavo-convex interior wall sections providing a lens function in operation. Moreover, since cooling and configuration control are achieved by fluid flow in contact with the plastic material when it is in a substantially elevated temperature condition, it becomes readily possible to apply a selected molecular coating on any or all surfaces by utilizing fluids which will react with the hot plastic material or condense thereon to form surface coatings providing the desired functional characteristics. For example, the interior thin wall sections configured to provide a lens function for the passage of solar radiation into the passages carrying the heat exchange medium in operation may be molecularly coated with infrared reflecting and wave shifter compositions which effectively enhance the recovery of heat by converting or shifting the radiation energy entering the panel at the shorter visible and ultraviolet wave length frequencies to longer wave lengths within the infrared wave length frequency range.

Other examples include molecular coatings on the interior surface of the heat exchange medium passages which provide resistance to aqueous, or other working fluid aggravated, deterioration to the plastic material.

Similarly, since both exterior thin wall sections are cooled by contact with fluids, similar benefits can be accomplished. For example, the fluids impinging upon the exterior surface of the panel structure which is presented to the sun in operation may include components which will react with the heated plastic material or condense thereon and provide a molecular coating which enhances the stress corrosion resistance and/or to minimize the entering light reflection characteristics of the plastic material. Finally, the vapor or liquid spray coating applied to the exterior surface, which constitutes the bottom of the panel in operation, desirably has the function of absorbing and re-radiating all wave lengths, with the further added feature of enabling the higher frequency wave lengths within the visible and ultraviolet range to be re-radiated in a wave shifting manner to infrared wave lengths such as previously indicated so as to enhance the effect of converting radiant energy to heat energy.

It is also within the contemplation of the present invention to apply coatings within some or all of the passages being formed by simultaneously admitting fluids or extruding a sleeve within each passage to be thus coated during the formation of the passage itself. In every instance, it is important to note that the application or formation of the coating while the receiving thin wall sections are moving outwardly from the extrusion outlet and are thus still quite hot, either enables such coatings to be applied (e.g. the gaseous conversion molecular coatings) or materially enhances their application (e.g. the sleeve, the liquid spray or the liquid roll-on coatings).

Another object of the present invention is the provision of an improved method of the type described which achieves conservation of valuable chemical agents by compositing relatively inexpensive material core systems with much smaller quantities of more expensive material selections.

Accordingly, it is a further object of the present invention to provide a panel structure of the type described having any one or any combination of one or more of the above-exemplified coatings applied thereto.

These and other objects of the present invention will become more apparent during the course of the following detailed description and appended claims.

The invention may best be understood with reference to the accompanying drawings wherein an illustrative embodiment is shown.

In the drawings:

FIG. 1 is a perspective view of one form of a panel structure embodying the principles of the present invention, formed by the apparatus and method of the present invention;

FIG. 2 is a top plan view of an apparatus embodying the principles of the present invention;

FIG. 3 is a side elevational view of the apparatus shown in FIG. 2;

FIG. 4 is an enlarged fragmentary sectional view taken along the line 4—4 of FIG. 2;

Figure 5:
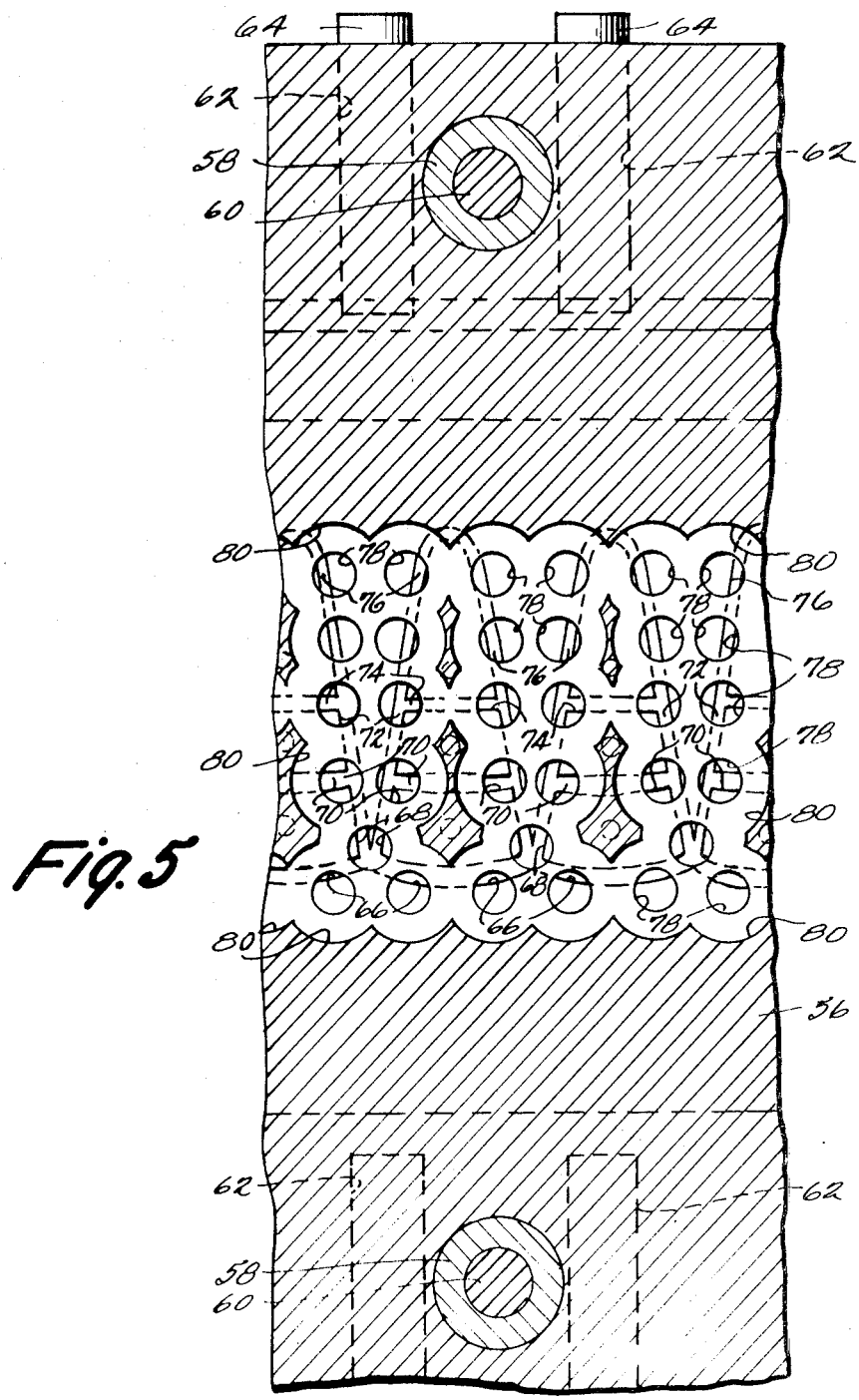
Figure 6:
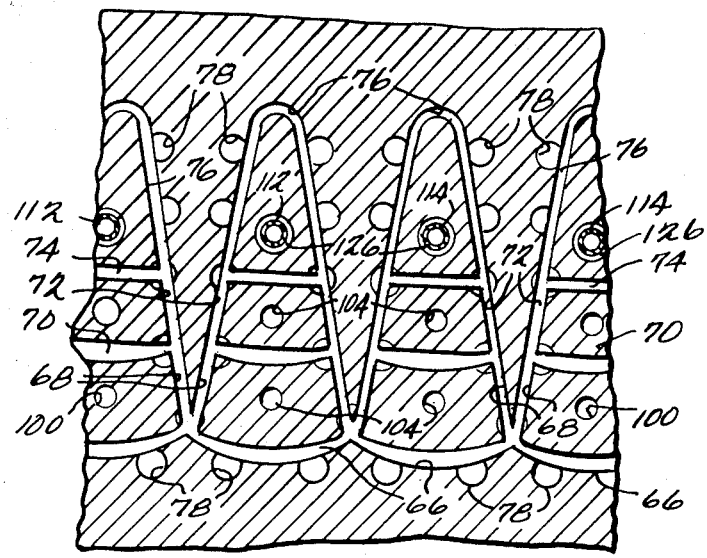
Figure 8:
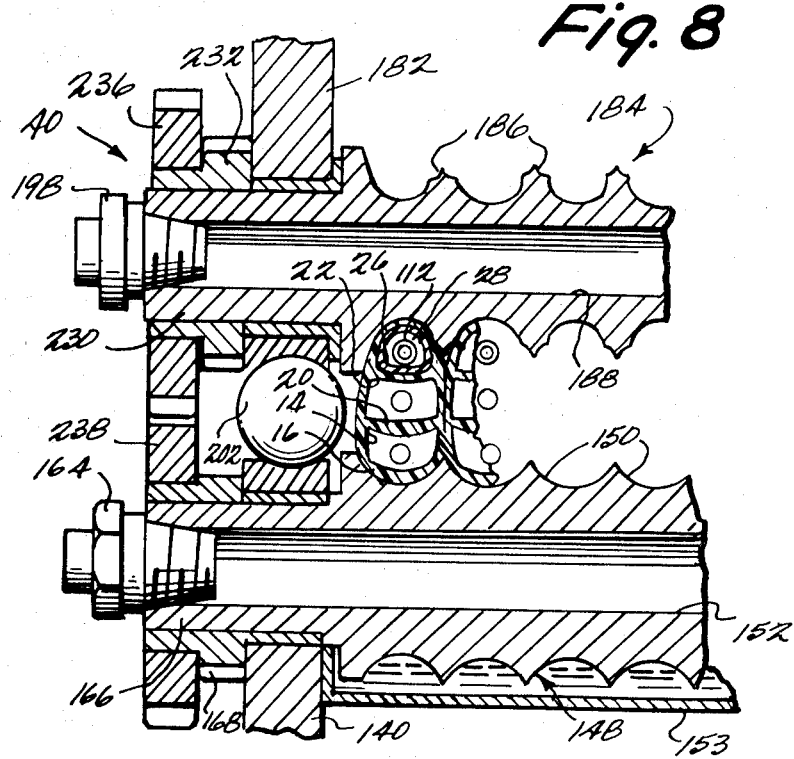
Figure 7:
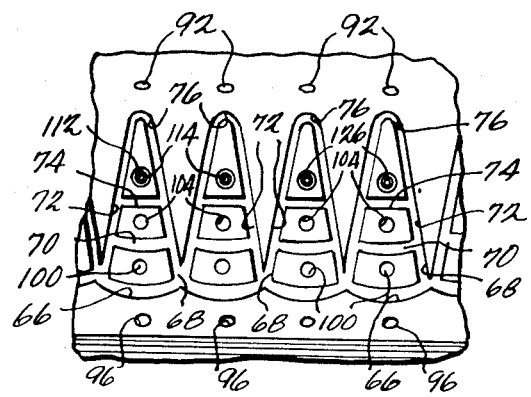
Figure 9:
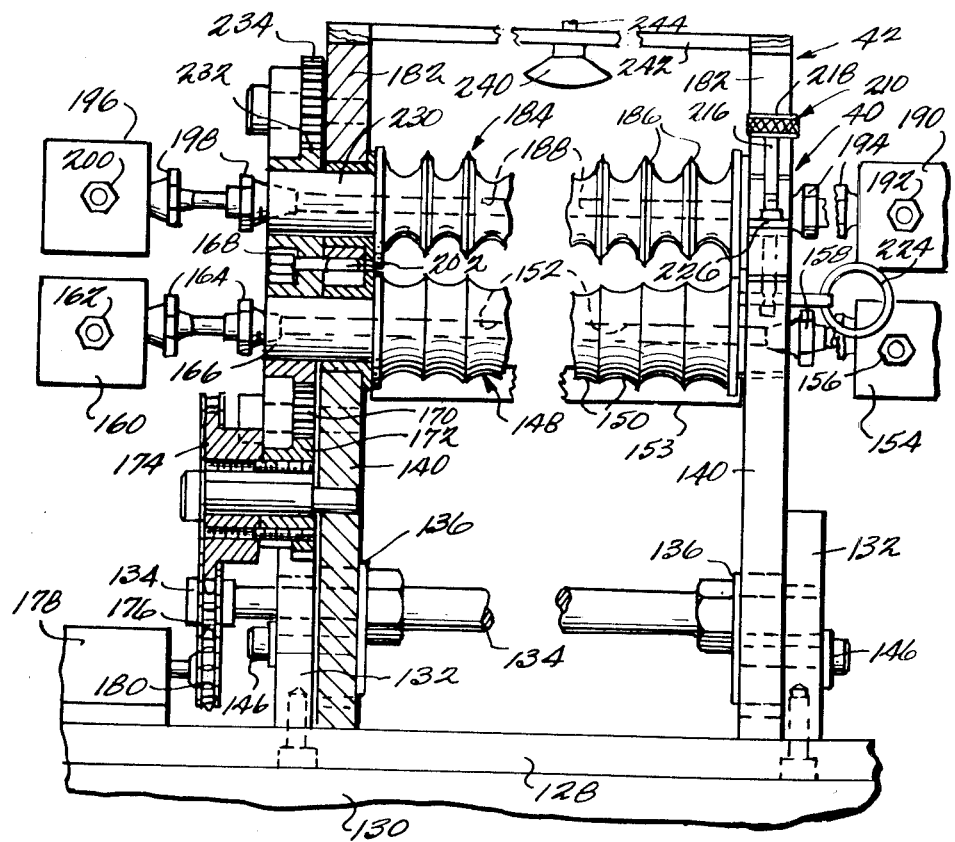
Figure 10:
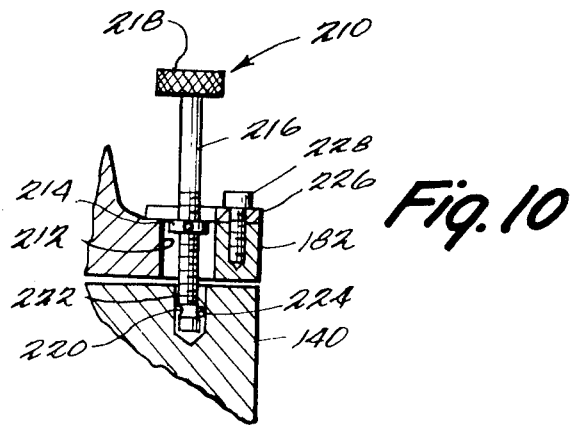

FIG. 5 is a view taken along the line 5—5 of FIG. 4;
FIG. 6 is a view taken along the line 6—6 of FIG. 4;
FIG. 7 is a view taken along the line 7—7 of FIG. 4;
FIG. 8 is a view taken along the line 8—8 of FIG. 4;
FIG. 9 is a fragmentary front elevational view partly in section, the sectional part being taken along the line 9—9 of FIG. 3; and FIG. 10 is a view taken along the line 10—10 of FIG. 2.

Referring now more particularly to the drawings, FIG. 1 illustrates one embodiment of a panel structure, generally indicated at 10, constructed in accordance with the principles of the present invention. It will be understood that the panel 10, as shown in FIG. 1, (wherein the thickness of the walls is exaggerated), is adapted to be manifolded and used in a radiant energy heat exchanger system in the manner described in my co-pending application Ser. No. 860,779 filed Dec. 15, 1977, now abandoned in favor of continuation application Ser. No. 98,814 filed Nov. 30, 1979, entitled "Radiant Energy Heat Exchanger System", the disclosure of which is hereby incorporated by reference into the present specification.

The panel structure 10 comprises essentially an extrusion made in accordance with the method of the present invention and by the apparatus of the present invention, which is generally indicated at 12 in FIG. 2.

The panel structure 10, as shown in FIG. 1, is made of a suitable plastic material and has a uniform cross-sectional configuration throughout its longitudinal extent. The essential characteristic of the panel structure is that it includes a multiplicity of parallel passages extending longitudinally therethrough defined by a multiplicity of longitudinally extending integrally interconnected exterior and interior thin wall sections. As shown, there are included a multiplicity of upper passageways 14 defined by upper exterior thin wall sections 16 of upwardly curving concavo-convex lens configuration, generally vertically extending interior thin wall sections 18 and upper interior wall sections 20 of a cross-sectional configuration similar to that of the wall sections 16. Disposed below the upper passages 14 is a multiplicity of intermediate passages 22 defined along their upper periphery by the upper interior thin wall sections 20 along their sides by downwardly converging vertically extending thin wall section 24 and along their lower peripheries by lower intermediate thin wall sections 26. Finally, the panel structure 10 includes a multiplicity of lower passages 28 disposed below the intermediate passages 22 defined along their upper peripheries by the lower interior thin wall section 26 and throughout the remainder of their peripheries by a lower generally U-shaped exterior thin wall section 30. In the embodiment shown in FIG. 1 a sleeve of coating material 32 is disposed in surface-to-surface engagement with the surfaces defining each of the lower passages. Where the sleeves 32 are provided as shown, the interior peripheries of the sleeves define the actual lower passages which are indicated at 34. The width dimension of each outer lens-shaped wall section 16 is approximately two and one half times the width dimension of each passage 34 (or 28 where no sleeves 32 are provided). It will be understood that the number of upper, intermediate and lower passages provided in the panel structure may be varied, depending upon the desired width. An exemplary embodiment is the provision of twenty-seven of each of the upper, intermediate and lower passages.

The apparatus 12 employed in accordance with the principles of the present invention for making the panel structure 10 as described above includes a combination of components, a first of which is a plastic feeder assembly, generally indicated at 36, of any known construction. The feeder assembly is arranged to receive a supply of plastic pellets at a predetermined dryness and temperature and to continuously impose a melting temperature and extrusion pressure onto the plastic material so that a continuous supply of the fused plastic will be delivered to an extrusion die assembly, generally indicated at 38, at a desired feeder temperature and pressure such that the plastic will flow longitudinally outwardly from the extrusion outlet of the die assembly.

The apparatus of the present invention also includes a panel handling assembly, generally indicated at 40, disposed within the path of the plastic material moving longitudinally outwardly of the extrusion outlet of the extrusion die assembly 38 for maintaining the longitudinal movement of the plastic material while reducing the temperature and controlling the exterior configuration of the plastic material until the same has cooled sufficiently to be self-sustaining. The apparatus 10 also includes a sprayer assembly 42 for applying an additional coating to the exterior surfaces of certain exterior thin wall sections of the panel structure 10.

The feeder assembly 36 constitutes essentially a known unit available on the commercial market. Any unit of suitable capacity may be utilized, an exemplary embodiment is the Pacemaker III Model 30/1 L/D made by NRM Corp. It will be understood that the unit includes the usual feeder hopper 43 which serves to direct the supply of plastic pellets to a feeder screw chamber where the plastic is moved along by the screw feeder while being continuously subjected to increasing temperature and pressure conditions. The outlet of the feeder assembly 36 is directly connected to the inlet of the die assembly 38.

The die assembly 38 includes a manifold block 44 having a lateral inlet (shown in phantom lines at 46 in FIG. 4) communicating with the outlet of the feeder assembly 36. Formed within the manifold block 44 in communication with the inlet 46 is a manifold space or main passage 48 which communicates forwardly in forwardly diverging relation, as indicated at 50, with one side of a flat screen pack 52 suitably mounted, as by bolts 54, on the rear surface of a main extrusion block 56. Taper frame adapter 51 provides a smooth flow path for entry into section 56.

The manifold block 44 is connected to the main extrusion block 56 in front-to-back abutting relation by a multiplicity of upper and lower bolt assemblies 58 extending through appropriate openings in the upper and lower bolt assemblies 58 extending through appropriate openings in the upper and lower portions of both blocks. The bolt assemblies provide a conventional securing function and in addition provide cavities for receipt of heating elements 60.

Extending vertically inwardly from the top of both blocks and upwardly from the bottom of both blocks is a multiplicity of spaced bores 62 within which are mounted temperature sensing units 64. As shown, there is a temperature sensing unit 64 spaced between adjacent bolts 58 both in the upper rear portion of the manifold block 44, upper portion of the extrusion block 56, the lower rear portion of the manifold block 44, and the lower portion of the extrusion block 56. It will be understood that the temperature sensing devices 64 are connected through suitable circuitry of conventional nature to control the energization of the heating units 60 so as to maintain the temperature of the plastic material within the manifold space 48 which flows into the screen pack 52 at a desired controlled temperature hereinafter to be more fully described.

The screen pack 52 preferably consists essentially of three screens assembled together in series, the downstream one of which is a 40×40 stainless steel screen, the intermediate one of which is an 80×80 stainless steel screen and the upstream one of which is a 100×100 stainless steel screen.

The forward end of the extrusion block 56 which constitutes the outlet end thereof has formed therein a multiplicity of interconnecting slots corresponding generally in number and position to the multiplicity of thin wall sections in the panel structure 10 as described above. The interconnecting slots which make up the extrusion outlet are best shown in FIG. 7 and it will be noted that the interconnected slots are preferably oriented in an inverted relation with respect to the orientation in which the resultant panel structure is actually used. Thus, there is provided a multiplicity of interconnected top forming slots 66 which are oriented at the lower part of the outlet but which correspond in configuration and number to the upper thin wall sections 16 of the panel structure 10. The top forming slots 66 interconnect with a multiplicity of side forming slots 68 which correspond with and form the thin wall sections 18 of the panel. The ends of the slots 68 are communicated by a series of interior slots 70 which correspond with and serve to form the upper intermediate interior thin wall sections 20. In a similar fashion, the ends of the slots 70 also communicate with upwardly converging slots 72 which correspond with and form the thin wall sections 24 of the panel structure 10. The upper ends of the slots 72 are interconnected by a series of slots 74 which correspond with and form the lower intermediate interior thin wall sections 26. Finally, the ends of the slots 74 are connected with the ends of an inverted U or V-shaped slot 76 which corresponds with and forms the lower exterior U-shaped thin wall section 30 of the panel. The interconnected slot configuration as described above may be formed by casting techniques or preferably formed in the forward outlet end of the extrusion block 56 by an electrochemical or electronic discharge machine so as to extend inwardly into the block a short distance. The interior of the interconnected slots is communicated with the plastic flowing through the screen pack 52 by a multiplicity of bores 78 formed by casting techniques or preferably drilling from the rear end of the extrusion block into communication with the inner ends of the slots in a configuration as best shown in FIG. 6. Each bore 78 is formed by casting techniques or preferably by drilling or boring operation and a frustoconical counterbore 80 (see FIG. 5) is provided in the rearward portion of each bore to aid in directing the plastic flowing through the screen pack 52 into the bores 78. By providing the bores in the orientation and number with respect to the slots as shown in FIGS. 5 and 6, flow of plastic from the manifold space 48 through the screen pack 52, counterbores 80, bores 78 and slots is achieved without stagnation or the generation of hot or cold spots which may cause material hang-up. The arrangement is such that an even flow of plastic material longitudinally outwardly of the extrusion outlet defined by the interconnected slots is achieved in conjunction with the temperature control provided by the temperature sensing devices 64 and heating devices 60. It will be understood that the disclosure of the present invention involves the definition of a fluid as a gas, vapor, or liquid that tends to assume the shape of the container that it is within.

An important aspect of the present invention is the provision in the extrusion block 56 of a plurality of separate fluid manifold openings 82, 84, 86, 88 and 90. As shown in FIGS. 3 and 4, each manifold opening is in the form of a bore extending transversely within the extrusion block 56 at positions above or below the plastic flow bores 78. Each manifold opening is supplied with a fluid from a supply container or the like, indicated schematically in FIG. 2 by the corresponding reference numeral with a subscript s, and has the fluid pressure supplied thereto controlled by a suitable control valve or regulator, indicated schematically in FIG. 2 by the corresponding reference numeral with a subscript c. An exemplary gas pressure regulator is the type 10B regulator made by Bellofram Corp. (see U.S. Pat. No. 2,879,783).

The manifold opening 82, best seen in FIG. 4, constitutes a fluid manifold for the flow of fluid onto the exterior thin wall sections 30 and 24 defining the operative bottom of the panel structure but preferably oriented in an upwardly facing direction as the panel structure moves outwardly of the slotted extrusion outlet. To this end, a multiplicity of fluid outlet openings 92 is formed in the forward outlet end of the extrusion block 56 above the inverted U-shaped slots 76. Each fluid outlet 92 extends from a position above the central portion of each inverted U-shaped slot 76 inwardly to the associated manifold opening 82. The flow through each outlet opening 92 is adjustably controlled by an adjusting set screw 94 threadedly engaged within the upper portion of the extrusion block 56 so that its conical inner end can be moved relatively into and out of the flow of fluid from the manifold 82 outwardly through the associated outlet opening 92.

The fluid manifold 84 is formed in the lower forward portion of the extrusion block 56 more or less vertically below the fluid manifold opening 82. This manifold opening communicates with the inner end of a multiplicity of outlet openings 96 which open to the forward outlet end of the extrusion block 56 at positions below the top forming slots 66. Each of the fluid outlet openings 96 is also provided with an individual control in the form of an adjusting set screw 98 having a conical end adapted to enter within the opening an amount determined by the position of movement of the set screw.

The manifold opening 86 communicates with a multiplicity of outlet openings 100 each of which extends from the manifold opening 86 to the outlet end of the extrusion block 56 at a position within an associated group of interconnected slots 66, 68 and 70 which serve to form the associated thin wall sections 16, 18 and 20 of the panel structure defining the associated top passage 14. Fluid within the manifold opening 86 therefore flows from the manifold opening 86 longitudinally outwardly of each outlet 100 into each top or upper passage 14 in the panel structure as the latter is formed and moves away from the die assembly. It will be noted that outlet passages 100 are formed by casting techniques or preferably by drilling a horizontal opening rearwardly into the forward outlet face of the extrusion block 56 and drilling an annular bore upwardly from the bottom of the extrusion block 56 through the laterally extending manifold bore 86, the outer end of each of the latter bores being counter-bored, threaded and plugged, as indicated at 102.

The manifold opening 88 has communicated therewith a multiplicity of outlet openings 104 which extend from the manifold openings 88 to the forward outlet end of the extrusion block 56. The forward end of each outlet opening 104 is positioned within an associated group of interconnected slots 70, 72 and 74 which serve to form the associated thin wall sections 20, 24, and 26 of the panel structure defining the associated intermediate passage 22. In this way, fluid within manifold opening 88 flows therefrom longitudinally outwardly of each outlet opening 104 into an associated passage 22 of the panel structure being formed and moving longitudinally away from the die assembly. It will be noted that each outlet opening 104 is formed by drilling a bore rearwardly from the forward outlet face of the extrusion block 56 and intersecting upwardly extending bore through the laterally extending manifold opening 88. The outer end of each of the latter bores is counter-bored, threaded and plugged, as indicated at 106.

Fluid manifold opening 90 is communicated with a multiplicity of vertically extending bores 108, each of which is formed by drilling downwardly from the upper surface of the extrusion block 56 through the manifold opening 90. The upper outer end of each bore 108 is counter-bored, threaded and plugged, as indicated at 110. The inner end of each bore 108 communicates with the inner end of a fluid outlet tube 112, the opposite end of which extends to the forward outlet end of the extrusion block 56 at a position within an associated group of outlet slots 74 and 76 which serve to form the thin wall sections 26 and 30 of the panel structure defining the associated bottom passage 28.

Extending inwardly within the extrusion block 56 in surrounding relation with the forward portion of each outlet tube 112 is a counterbore 114. An annular seal 116 is mounted within the inner end of each counterbore in surrounding relation to the associated tube 112. Communicating with each counterbore 114 at a position between the outer end and seal thereof is one end of an inclined bore 118 which extends through a laterally extending manifold opening 120. The outer end of each bore 118 is counter-bored, threaded and plugged, as indicated at 122. The manifold 120 is adapted to receive a liquid fluid or second heated plastic material from a second feeder of conventional design, indicated schematically at 124. Material from the feeder flows into the manifold 120 outwardly thereof into bores 118 and from the bores 118 into the associated counterbores 114 in surrounding relation to the associated tubes 112. An extrusion cone 126 is fixed in surrounding relation to the associated tubes 112. Extrusion cone 126 is fixed in surrounding relation to the outer end of each tube 112 so as to define a thin annular slit-shaped outlet which serves to evenly distribute the material so provided into a sleeve positioned within the passage 28 of the panel structure being formed. It will also be noted that since the sleeve of material issuing from the annular outlet slit defined by cone 126 is disposed in surrounding relation to the associated outlet of the tube 112, the flow of fluid from the tube outlet will serve to immediately expand the sleeve from 126 into engagement with the surface of the associated thicker thin wall sections 26 and 30.

The panel handling assembly 40, as shown, includes a main base plate 128 which is fixed to the upper surface of a suitable table 130 or the like. Extending upwardly from the base plate 128 and rigidly secured thereto is a pair of parallel vertical mounting plates 132. Each mounting plate has journaled in the central portion thereof one end of a shaft 134. A circular cam 136 is fixed to each end portion of the shaft 134 inwardly of the associated plate 132 so as to be disposed within a rectangular opening 138 formed in an associated side plate 140. Each of the mounting plates 132 is formed with a pair of parallel vertically extending slots 144 on opposite sides of the rectangular opening 134 which receive therein bolt assemblies 146 threadedly engaged within the associated side plate 140. It can be seen that with the arrangement thusfar described, side plates 140 can be adjusted vertically with respect to the mounting plates 132 and table 130 by loosening bolt assemblies 146 and turning shaft 134. After the appropriate adjustment has been made bolt assemblies 146 are tightened to maintain the side plates 140 in fixed adjusted relation with respect to the mounting plates 132.

Journaled between each of the side plates 140 is one end of a series of horizontally spaced rollers, generally indicated at 148. It will be noted that each of the rollers 148 is formed with an annular peripheral surface 150 having a configuration which, in cross-sectional profile, corresponds with the cross-sectional profile of the exterior surfaces of the top thin wall sections 16 of the panel structure. It will also be noted that each of the rollers 148 is hollow and is provided with a through passage 152 (FIG. 9). A suitable liquid dispensing tray 153 is also supported by base plate 128 and provides liquid wetting of at least one lower profile roller 148 which, as shown, is the forwardmost roller. Liquid solution within the tray 153 is thus carried into contact with exterior surfaces of the top thin wall sections 16 of the panel structure.

Mounted alongside one of the side plates 140 is a heat exchange fluid inlet manifold block 154 having an inlet 156 which is adapted to receive heat exchange fluid, which preferably is water, from an appropriate source (not shown). Other heat exchange fluid selections contemplated are freon, silicone oil and glycol. The inlet manifold block 154 is communicated with the interior passage 152 of the adjacent side of each of the rollers 148 by means of appropriate rotary fittings 158. An outlet manifold block 160 of similar construction to the inlet manifold block 154 is mounted alongside the other side plate 140 and has an outlet connection 162 for returning the heat exchange fluid to a suitable source for handling the same (not shown). The outlet manifold block 160, like the inlet manifold block 154, is communicated with the passages 152 of each of the rollers 148 by a series of rotary fittings 164 connected between the adjacent ends of the rollers 148 and the manifold block 160.

It will be noted that each of the rollers 148 is formed with a hub extension 166 on one end thereof to which is fixedly mounted a spur gear 168. In the embodiment shown there are six rollers 148 and hence six spur gears 168 provided. The spur gears 168 are driven in a clockwise direction as viewed in FIG. 3, so that the upper peripheries of the rollers 148 move in a direction longitudinally away from the die assembly 38 by a series of idler gears 170 suitably journaled on the associated side plate 140. As shown, there are five idler gears 170 provided, each idler gear meshing with two spur gears 168 disposed thereabove. Mounted on the downstream end of the associated side plate 140 is a main drive spur gear 172 meshing with the adjacent spur gear 170. Main drive spur gear 172 is fixed to a drive sprocket 174 which is adapted to be driven by a chain 176 which, in turn, is driven by a suitable motor 178 driving sprocket 170 about which the chain 176 is trained. It thus can be seen that by energizing motor 178, which can be a variable speed motor or which can be provided with a speed adjusting transmission, rollers 148 will be rotated in the same longitudinally forward direction at the desired speed selected.

Mounted above each fixed side plate 140 is a movable side plate 182. Suitably journaled between the plates 182 is a series of upper rollers, generally indicated at 184. Each of the rollers 184 is adapted to cooperate with a corresponding one of the rollers 148 so as to provide a pair of cooperating rollers engaging the upper and lower exterior surfaces of the panel structure as it moves longitudinally outwardly of the extrusion die assembly 38. To this end, each of the rollers 184 is formed with an exterior peripheral surface 186 having a configuration which, in cross-sectional profile, corresponds with the cross-sectional profile of the bottom exterior surface of the thin wall sections 30 of the panel structure. Moreover, like the rollers 148, the rollers 184 are formed with cooling fluid passages 188 extending longitudinally therethrough, one end of which communicates with an inlet manifold block 190 similar to the inlet manifold block 154. Thus, the inlet manifold block 190 includes a fitting 192 enabling the same to be connected with a source of cooling fluid and a plurality of rotary fittings 194 interconnected between the inlet manifold block 190 and the ends of the rollers 184. In a like manner, an outlet manifold block 196 communicates with the opposite ends of the roller passages 188 through rotary fittings 198. As before, the outlet manifold block 186 has an outlet fitting 200 connected therewith for returning the cooling fluid to a suitable return source (not shown).

The movable side plates 182 which are connected to move together by virtue of the mounting of the rollers 184 therebetween are mounted on the upper edge of the fixed side plates 140 by a pair of balls 202 seated within the appropriate recesses in the upper rearward surface of the associated movable side plate 182. A rod 204 extends downwardly through an appropriate opening in the rearward end of each movable side plate 182 and is threadedly engaged in fixed relation within the rearward end of the associated fixed side plate 140. The upper end of each rod extends above the end of the associated movable side plate 182 and has its upper end threaded to receive a wing nut 206. Mounted between each wing nut 206 and the upper surface of the associated movable side plate 182 in surrounding relation to the associated rod 204 is a coil spring 208 which serves to apply a resilient downwardly acting biasing force on the rearward end of the associated movable side plate 182 tending to cause the same to pivot about the axis of the ball 202 in a counterclockwise direction as viewed in FIG. 3.

The forward end of each movable side plate 182 is adjustably releasably fixedly attached to the forward end of the associated fixed side wall 140 by a mechanism, generally indicated at 210, which is shown in detail in FIG. 10. As shown, the forward end of each movable side plate 182 is formed with a vertical opening 212. Mounted within the upper portion of the opening 212 is a gimbel element 214 in the form of a collar having its interior periphery threaded and a pair of pivot pin portions extending in diametrically opposed relation from the exterior periphery thereof which seat within appropriate upwardly facing grooves in the upper surface of the side plate 182 in communication with the opening 212. A threaded stem 216 having a knurled knob 218 on the upper end thereof is threadedly engaged within the gimbel 214. Formed in the exterior periphery of the lower end of the threaded stem 216 is an annular groove 220 which is adapted to engage within a vertical bore 222 formed within the upper end of the associated fixed side plate 140. A pull pin 224 is removably extended within an appropriate transverse opening in the side plate 140 in a position to engage within the annular groove 220. Finally, it will be noted that a slotted plate 226 is removably fixedly attached to the upper surface of the movable side plate 182, as by a bolt 228, so as to prevent upward movement of the gimbel 214. It can thus be seen that by turning knobs 218, the position of the associated ends of the movable side plates 182 can be adjusted vertically with respect to the fixed side plates 140. In the event of a product jam where rapid separation of the cooperating rollers is desired, pull pins 224 are pulled, thus enabling the spring 208 to resiliently bias the forward ends of the movable side plates 182 upwardly about the balls 202 as an axis.

The upper rollers 184 are driven at the same speed and in the same direction, namely a direction in which the lower periphery moves in a longitudinally outward direction with respect to the die assembly, in a manner similar to the movement of the lower rolls 148. Thus, each upper roller 184 includes an extended hub portion 230 at one end having a spur gear 232 fixed thereto. The spur gears 232 are drivingly interconnected by means of five idler gears 234 suitably journaled on the associated movable side plate 182, each idler gear being positioned above and between two adjacent spur gears 232 in meshing engagement therewith. As best shown in FIG. 8, the upper rollers 232 are driven by a spur gear 236 fixed to the rearwardmost spur gear 232 and disposed in meshing engagement with a cooperating spur gear 238 fixed with respect to the rearwardmost spur gear 168 associated with the rearwardmost roller 184.

Sprayer assembly 42 preferably consists of a series of fan-shaped spray forming nozzles 240 of conventional "airless" construction mounted, as by a mounting tube 242 fixed between the rearward portions of the movable side plates 182, so as to dispose the discharge outlets of the spray nozzles above and between the rearwardmost upper roller and the next adjacent upper roller. Rollers 184 thus provide even distribution of the applied coating. The inlets of the fan-shaped spray forming nozzles 240 are connected with a line 244 connected with a source of spray liquid under pressure (not shown).

As will become more apparent hereinafter, the cooperative operation of the panel handling assembly 40 and extrusion die assembly 44-56 is such that as the extruded panel structure leaves the forwardmost pair of rollers, the thin wall sections thereof are sufficiently cooled to be self-sustaining and use of the heat thus removed promotes the numerous chemical process reactions described herein. It will also be understood that further handling equipment (not shown) would be provided, as for example, an adjustable haul-off device for providing a positive controlled movement for the panel structure at a position downstream. In addition, an appropriate crosscutting mechanism would be provided for cutting the panel structure into appropriate lengths. In accordance with usual practice, such cutting mechanism is appropriately mounted on a longitudinally reciprocable carriage, the cutting element such as a laser, a hot wire or thin band saw blade being reciprocated transversely on the longitudinally reciprocating carriage. By suitably timing the reciprocating cycles, the cutting action can be achieved during the continuous movement of the panel structure, all of which is a matter of conventional knowledge.

It is contemplated that for certain plastic resin selections requiring rapid quenching from the molten state for purposes of producing high optical transparency that die assembly 44-56 and roller assembly 12 would be disposed to extrude the panel at a steep downward or vertical inclination. Operation at steep inclinations enables fluids such as silicone oil to drain through the panel while performing cooling and coating carrier functions to a sump (not shown) for recovery, and recirculation.

With the above in mind it will be understood that there is provided by the present apparatus a structural arrangement for performing procedural steps on plastic materials through which highly desirable physical and chemical characteristics can be economically imparted to the resultant panel structure. Included within the contemplation of the present invention are variables in the initial plastic material utilized in the feeder assembly 36 to form the panel structure, the optical use of the secondary fluidized material in the feeder 124 for the interior sleeves 32, the provision of appropriate gaseous or vapor or liquid materials within the manifold openings 82, 84, 86, 88 and 90, and the composition of the liquid spray used within the sprayer assembly 42. It is further contemplated that the fluid selected for circulation through manifold openings 82, 84, 86, 88 and 90 can be high boiling point mineral or silicone oils with certain active ingredients more fully illustrated below.

A preferred embodiment of the plastic material for many applications is polycarbonate. This material presents a desirable blend in the various qualities desired in a solar energy panel structure such as a high melting point, high transparency to solar energy frequencies, resistance to ultraviolet deterioration, impact resistance, recoverability after use, present raw material availability and cost. Thus, the material selected for use in forming the panel structure should possess the above characteristics to a high degree or should be capable of having such characteristics enhanced in an easy and economical fashion by suitable additives or composited coatings. Polycarbonate presents a desirable high melting point, is highly transparent presenting only a 3% loss when fabricated according to the preferred methods described herein and is highly impact resistant. Impact resistance is important in order to enable the panel structure to be handled during shipping and installation, as well as to resist the effects of hail and the like once installed. Polycarbonate also is highly recoverable after use and its cost is not prohibitive, although other plastic materials are considerably less expensive. The solar collector described herein is able to deliver more than 800 times as much energy in its first service life as could be delivered if the same plastic were burned in a conventional electric power plant and the electric energy were delivered through conventional power grids. Polycarbonate's ability to resist ultraviolet radiation is easily enhanced by adding ultraviolet active material thereto and its tendency to be unstable in water under stress can be alleviated and its resistance to stress corrosion enhanced by suitable additives.

Of course, the procedures which are employed in making the panel structure will desirably vary depending upon the end use or type of system in which the panel structure is to be used. For example, in potable hot water heating systems where the two upper passages 14 and 22 of the panel structure are used as insulating air spaces and the lower passages 28 are used to circulate the water medium, the addition of an expensive, thick sleeve lining 32 within the lower passages 28 is not regarded to be essential. Such sleeve linings would be provided in commercial installations where the fluid being circulated in the lower passages 34 might well contain chemicals which require a much more inert plastic material. Where the upper two passages 14 and 22 are utilized to circulate the same fluid medium as the lower passage, appropriate modification within the upper passages including modification of the die structure to provide an interior sleeve capability in these passages as well, may be desired. With the above in mind, a preferred example of the procedures utilized in practicing the present invention will be given for a panel structure which is to be employed in a residential hot water system.

Alternate working fluids for sourcing or removing heat during operation of the resulting radiative energy heat exchanger include water-glycol solutions, acids, bases, silicone fluids, dry cleaning fluids, oils of all kinds, salt water solutions of all kinds, alcohols, and suspensions of magnetically separable particles compounded to produce energy conversion and asthetic effects.

Preferably, polycarbonate is utilized as the primary plastic material for forming the panel, however, the polycarbonate utilized is mixed with ½% to 2% by weight of a suitable fluorescent dye additive such as Cyasorb. This ingredient enhances the resistance of the polycarbonate to deterioration from ultraviolet rays. It is important to note, however, that ultraviolet deterioration resistance preferably is imparted not by blocking ultraviolet radiations from entering the plastic material, but rather by permitting such radiation energy to pass through the material at a shifted or increased wavelength. The addition of the fluorescent dye additive Cyasorb to the polycarbonate serves to shift wavelengths passing therethrough of 0.25-0.37 microns to 0.4-2.0 microns. The shifting of the shorter wavelengths in the ultraviolet range to longer wavelengths in the visible or infrared range, rather than reflecting or locally absorbing such radiation, permits more of the available radiation energy to be used in heating the working fluid, since, in the case of water, all wavelengths of 1.8 microns and longer are absorbed. The desirability of wavelength shifting from the shorter ultraviolet and visible range to the longer visible and infrared range is thus a desirable characteristic and should be borne in mind in the subsequent procedures hereinafter set forth.

The wave shifter additive noted above is preferably embodied in the base material itself and further incorporated in the liquid within the tray 153 as will become more apparent hereinafter. Prior to being fed to the feeder assembly 36 the pellets are dried for several hours at a temperature of 250° in a hopper with hot desiccated air constantly blowing therethrough. The feeder assembly 36 is operated such that there exists at the outlet a pressure of approximately 7000 psi and a temperature of 500° F. It will be understood, however, that the operating psi may be varied from approximately 2000 psi to approximately 12000 psi and the temperature may be varied from approximately 460° F. to approximately 530° F. The temperature controls within the die assembly 38 are set to maintain the plastic material passing therethrough at 500° F. Here again, a range of variation between approximately 480° F. to approximately 520° F. can be effected. The pressure of the plastic material within the die adjacent the outlet is 4000 psi and here again a range can be employed of approximately 2000 psi to approximately 6000 psi.

In connection with the operation of the feeder, a further important aspect of the present invention is to supply to the polycarbonate material being processed through the feeder further additives which will enhance the stress corrosion resistance of the polycarbonate material. Stress corrosion responses in polycarbonate material without the present additive are characterized by cracking, pitting, loss of ductility, and weight loss by mass fall-out of exposed areas. These responses are noted as attacks following stepwise polymer bond breakage. These responses are more pronounced in the presence of residual or induced stress and increase with increasing temperature environments, as for example, environments in excess of 140° F. which can be presented in radiant energy heat exchange systems. As best shown in FIG. 2, a supply pipe 246 is provided for the purpose of introducing or supplying the further additive to the polycarbonate material within the feeder at a position therein after the solid pellets of material have been heated but before the material has reached its fusion temperature. A preferred additive is a 2-20% by weight of a trimethylchlorosilane vapor mixed with 98-80% dry nitrogen. The vapor mixture is fed at room temperature at a pressure of approximately 75 psi at a position such that it will contact the resin within the feeder at a temperature of approximately 100° F. to 500° F. The vapor mixture chemically reacts with dried polycarbonate resin, particularly as it fuses, so that the polycarbonate end group produces a polycarbonate without stress corrosion susceptible areas.

The supplying of the stress corrosion resistant additive in the feeder is shown schematically. A detailed disclosure of the structure for accomplishing the reaction within the extruder is disclosed in my application Ser. No. 32,633 entitled "THERMOPLASTIC POLYESTER RESINS WITH IMPROVED STRESS CORROSION RESISTANCE", Docket 24, filed Apr. 23, 1979, the disclosure of which is hereby incorporated by reference into the present application. It will be understood, however, that it is within the contemplation of the present application to utilize feed pellets which have previously been treated with the additive in the feeder of the present invention.

The fluid fed to the manifold opening 82 which impinges on the operative bottom surface of the panel structure is preferably 100% dry air. It is maintained at a pressure of 20 psi and at room temperature. Variation in the temperature is possible, although since room temperature is entirely adequate, variation is not usually necessary. The pressure can be varied as desired, for example, from 10 to 30 psi.

The fluid fed to the fluid manifold opening 84 is preferably 90% to 98% dry nitrogen mixed with 2% to 10% trimethylchlorosilane. This mixture has been found effective starting at room temperature and it is maintained at a pressure of 10 psi. Here again, while the temperature of the gas can be varied, since room temperature is entirely operable because of the invention's use of the panel resin's heat of fusion, any variation in temperature is unnecessary although contemplated. The pressure can vary as desired, for example, from 5 to 15 psi.

Since the fluid mixture noted above fed to the manifold opening 84 is discharged under the pressure conditions noted through the individual outlets 96 and impinges upon the exterior surfaces of the heated thin top wall sections 16 of the panel structure issuing from the interconnected slots 66, a chemical conversion takes place which applies a molecular coating of a methyl silane, while splitting out hydrogen chloride, to the exterior operative top surface of the panel structure exposed to the sun. This molecular coating materially enhances the stress corrosion resistance of the polycarbonate material forming the panel structure.

The fluid fed to the fluid manifold opening 86 is preferably 100% dry air at room temperature. The appropriate control 86c is set to maintain the gas pressure at approximately 2.5 psi. Thus, the gas which flows outwardly of the outlets 100 into the upper passages 14 of the panel structure is essentially inert since in the preferred operative embodiment these passages merely contain insulating air.

The fluid which is fed to the fluid manifold opening 88 is a mixture of 85 to 97% nitrogen and 3 to 15% silicon tetrahydride. The gas is fed to the manifold opening 88 at room temperature and is maintained by the associated control 88c at a pressure of approximately 3.5 psi. Since the mixture fed to the manifold 88 flows outwardly of the outlet openings 104 into the intermediate passages 22 of the panel structure being formed while the latter is hot, there is a chemical conversion which takes place, resulting in the application of a molecular coating of a silane to the interior surfaces of the thin wall sections 20, 24 and 26, defining the interior openings 22. This molecular coating has the characteristic of shifting radiant energy within the range of 0.2 to 0.7 microns to wavelengths of 1.8 microns and above.

In the preferred embodiment for domestic potable water heating, sleeves 32 are not utilized within the passages 28 and consequently outlets 126, fluid passages 114 and 118, manifold opening 120 and auxiliary fluidized medium feeding device 124 are not utilized.

The fluid fed to the manifold opening 90 is a mixture of 75 to 98% by weight of nitrogen and 2 to 25% of tetrafluoroethylene. The gas is supplied at room temperature and maintained at a pressure of approximately 5 psi. Since the gaseous mixture within the manifold opening 90 passes outwardly from the outlet end of the tubes 112 into the passages 28 directly into contact with the interior surfaces of the thin wall sections 26 and 30 defining the passages 28, there is an immediate in situ polymerization of the TFE which applies a molecular coating of polymerized TFE to the interior surfaces of the thin wall sections 26 and 30 defining the passages 28. This molecular coating also provides resistance to aqueous attack and enhances the stability of the polycarbonate material exposed to other fluid solvents.

A preferred liquid spray which is fed to the spray forming nozzles 240 at a preferred pressure of approximately 2500 psi and at room temperature, is a latex mixture having a solids content of 40% by total weight (within a range of 15-65%) which applies a water vehicle coating to the exterior surface of the panel forming the bottom thereof in operation.

A preferred composition of the mixture includes a resinous carrier ingredient, a latex forming ingredient, and an active waveshifting ingredient. Set forth below is a preferred list of ingredients on a % of solids basis which includes two resinous carriers.

25% (range 20-30%) acrylic-aminohydrochloride salt of a methacrylic ester monomer which is water soluble and has carboxyl groups:

35% (range 30-40%) polyvinylidene fluoride;

5% (range 3-7%) polymethacrylatesiloxane;

35% (range 23-47%) zinc sulfide with 2% (range 0.5 to 3%) by weight solid solution of copper sulfide.

The coating is totally opaque to radiant energy of all wavelengths. Solar energy of all wavelengths is absorbed and re-radiated, however, within the region of between 0.4 and longer microns into the infrared range. This re-radiated energy is, because of the panel's geometry, focused upon the working fluid.

Liquid applied from tray 153 is preferably a water clear latex of terpolymer consisting of 10-25% solids of chlorotrifluoroethylene, 50-75% solids of polyvinylidenefluoride and 15-25% solids of polyvinylidene chloride in a liquid component consisting of 49% distilled water and 48.5% Dow xC 7080 and 1.5% Dow Epoxy product DER, the solid to total ratio being between 25%-50% solids.

In operation, rollers 148 provide the combined function of introducing the latex on surfaces 16 (pretreated through a gas phase reaction), and evenly rolling the applied latex to a dense even film. The function of the clear resulting dried terpolymer film is to provide a low index of refraction, scratch and chemical resistant coating and to serve as a vehicle for certain fluorescent dye additives.

It is important to note the reduction in temperature of the plastic material as it moves from a position adjacent the outlet of the die assembly 38 to a position adjacent the forwardmost pair of cooperating rollers 148 and 184. The temperature at the outlet is essentially 500° F. Immediately following the outlet every surface of the plastic material is contacted by a cooling medium at room temperature. In addition to offering significantly improved production rates for a nearly finished solar panel, advantageous conservation of coating material is offered while performing cooling functions. Coating material from tray 153 is efficiently placed on the solar panel without over spray or masking inefficiencies. Set screw adjusters 94 and 98 are provided for the purpose of further temperature control.

In addition to all of the fluid mediums which are contacting each exterior and interior surface of the plastic material being extruded, the exterior surfaces of the plastic material are immediately contacted by the first set of rollers 148 and 184 having circulating therethrough a heat exchange fluid medium, preferably water, maintained at near room temperature. At this point the exterior thin wall sections 16, 24 and 30 are at a temperature which is sufficiently high that they are not self-sustaining. Moreover, the interior thin wall sections 20 and 26 are likewise at an elevated temperature such that they are not self-sustaining. However, the existence of the aforesaid differential pressures of 2.5 psi, 3.5 psi and 5 psi maintained within the interior passages 14, 22 and 28 respectively serves to impart the desired concavo-convex configuration to the interior thin wall sections 20 and 26. In this regard, it will be understood that while these interior thin wall sections are shown as having a concentrating lens-form by virtue of being extruded from lens-form slots, a variable arch radius providing an enhanced lens effect is also contemplated. This is provided by adjustment of the aforesaid differential pressures and enables customizing the panel's concentration factor to each climatological area of application.

The above-described interior passage pressures also serve to maintain contact of the exterior thin wall sections 16 with the roller surfaces 150 and the exterior thin wall sections 24 and 30 with the exterior surface 186 of the rollers 184. In this regard it will be noted that the spacing between successive pairs of rollers 148 and 184 progressively diminishes so that a slight change in the exterior configuration of the panel structure is provided during the movement through all of the pairs of rollers. This assures dense, even, completely cured out coatings, and close geometrical control of the panel geometry. After passage through the last pair of rollers, the exterior thin wall sections are essentially self-sustaining. The interior thin wall sections are either simultaneously made self-sustaining or become so shortly thereafter. The coatings provided by the application of the fluids as well as the application of the liquid spray and roller coating are made possible and enhanced by virtue of their being applied while the plastic is near its highest temperature. The coating applied by the sprayer assembly 42 is particularly tenacious in that the particles by virtue of the heat within the plastic material are maintained in efficient adhesion and compression through an after heating phenomena as the interior wall sections are finally cooled to uniform panel temperature.

It is within the contemplation of the present invention to vary the materials utilized from the preferred specific examples given above. For example, the main plastic material which is fed to the feeder assembly can be, in place of the preferred polycarbonate material, any one of the following materials: polychlorotrifluoroethylene, polypropylene, polymethylpentene, polymethyl methacrylate (limited to an operating temperature not over 125° C.) and other acrylates, 7-30% polyvinylidene fluoride—polymethyl methacrylate alloys, polysulfones, e.g. polyether sulfone polyarylsulfone, Bisphenol A-sulfone or Hydroquinone sulfone, and thermoplastic silicones.

The ultraviolet stabilizer in place of Cyasorb 5411, can be 6,13-dichloro-3, 10-diphenyltriphenodioxazene, Tenuvin P or other conventional UV stabilizer.

In place of the trimethylchlorosilane stress corrosion resistant additive, other halogenated organosilanes may be utilized, for example, the family of chlorodiphenylsilane, hexamethyldisilane, vinyltrichlorosilane, trimethylbromosilane, triethylchlorosilane, hexaethyldisilane and dimethyldichlorosilane. In place of nitrogen, air or other inert gases may be utilized.

Fluids which can be fed to the manifold opening 82 other than the preferred 100% dry air include nitrogen argon, helium, oxygen, carbon dioxide or other gases inert under the treatment conditions.

Fluids which can be fed to the manifold opening 84 other than the mixture of trimethylchlorosilane and nitrogen include methyltrichlorosilane or dichlorodimethylsilane mixed with dry air or other inert gas, as indicated above.

Gases which can be fed to the manifold opening 86 other than the 100% dry air are nitrogen, argon, helium, oxygen, carbon dioxide or other gas inert under the treatment conditions.

Gases which can be fed to the manifold opening 88 other than the mixture of nitrogen or other inert gas and silicontetrahydride are mixtures of nitrogen or other inert gas with trimethylchlorosilane, methyltrichlorosilane, dichlorodimethylsilane or silicontetrachloride. As inert gas and dilutant there can be used oxygen, helium or carbon dioxide.

Where the liquid feeding device 24 is utilized to provide coatings 32 within the passages 28, exemplary auxiliary plastics which can be utilized to provide desired optical functions, chemical resistance, or improved heat transfer are: melted polysulfone, polyvinylidenefluoride, chlorotrifluoroethylene, polymethylpentane, polypropylene; latex coatings of polyvinylidene chloride, varnishes of the aforesaid in suitable solvents; thermovinylizing plastisols and organosols; silicone emulsions and dispersions; and dye colorants in any of the aforesaid vehicles. It is also contemplated that latexes, varnishes, adhesive preparations and thermoplastics would be applied through manifold 78 to passages 28 for purposes of holding in place fibers, whiskers, and particles carried by gaseous or liquid fluids through 90 to form high surface-to-volume coatings for improved radiant energy conversion to heat. Fibers particularly useful for this purpose are $Al_2O_3$; BeO; SiC; $B_4C$; $Si_3N_4$; and graphite. Materials entered into passages 28 through 90 and 78 may produce high surface to volume deposits rather than molecular coatings. A particularly useful solar collector (see, for example, FIG. 2 of the aforesaid application Ser. No. 098,814) now U.S. Pat. No. 4,279,244 issued July 21, 1981 for heating gaseous working fluids is prepared by admitting suitable liquid adhesives such as allyl diglycol carbonate (CR-39), diallyl phthalate (DAPON) urethane, or epoxy through 78 and suitable fibers or whiskers such as carbon, $Al_2O_3$, $Z_rO_2$, SiC, aluminum, or BN through 90 in a gas stream. A relatively thin gap of about 0.0003 inches at the annular orifice produced by tube 112 within bore 114 produces an even distribution of liquid adhesive upon the hot panel walls being extruded. Clear allyl diglycol carbonate thermo set is the preferred adhesive. Carbon filaments, preferably of a curved form about 0.0005 inches diameter by about 0.020 inches in length are blown through 90 in a stream of air or other inert gas and deposited upon the curing adhesive. The preferred carbon filament is prepared by thermal degradation of organic rayon filament. The heat available from the panel walls rapidly sets the thin adhesive and the deposited fibers may be largely oriented as whiskers standing against the inside surface of the panel. The resulting coating of adhesive and whisker deposit converts 30% or more of the incoming light penetrating 26 to heat on whiskers immediately below 26. About 70% of the light passes to the remaining whisker coating surfaces where it is converted to heat. Gaseous working fluids circulated within passages 34 are thus exposed to a high surface to volume fiberous coating for maximum heat transfer.

Any number of variations of the coating 30 geometry are possible by machining the head of tube 112. Entry gaps may be for top, bottom, or side coating passages 28. A particularly useful deposit is made by arranging the gap between 112 and 114 to be an eccentric crescent shaped geometry, having maximum gap of about 0.006 inch near one end. Thermosetting liquid plastisols such as allyl diglycol carbonate or diallyl phthalate, because of unequal flow rates through the eccentric crescent, tend to form spiral shaped fins against the walls of passages 28. The lead of the spiral end resulting spacing between the helical ridge of the spiral is dependent upon the pressure and viscosity of the entering thermoset. The thermoset coated areas may be further coated with whisker or particle deposits from air streams conducted through 90 as previously described. Dyes and fillers may also be incorporated in the thermoset liquids for optical and heat transfer effects.

Gases fed to the manifold opening 90 other than the mixture of nitrogen and tetrafluoroethylene are a mixture of other inert gas, e.g. argon, helium or carbon dioxide with tetrafluoroethylene, hexafluoropropylene, acetylene plus fluorine or chlorotrifluoroethylene.

Variations in the composition of the liquid spray from the specific example previously given are also contemplated. In place of the water, kerosene or parafin alcohols can be utilized, such as methanol, ethanol, propanol and isopropanol. In place of the acrylic and polyvinylfluoride resinous carriers previously listed, which may be used singly if desired, the following resinous carriers can be used, either singly or in combination: tetrafluoroethylene, chlorotrifluoroethylene, hexafluoropropylene, or polyvinylidene chloride. In place of the polymethacrylatesiloxane latex forming ingredient there can be used methylcellosolveacetate. Commercially available resinous latex compositions can be utilized in which case there would be no need for a separate latex forming ingredient, for example, the acrylic latex Dow XC7080, the epoxy latex Dow DER-mixed with DER732 or Rohm & Haas Rhoplex which is an aminohydrochloride salt of an acrylic resin. In lieu of the zinc sulfide solid solution active ingredient, there can be utilized an iron sulfide solid solution with a yttrium dopant, zinc oxide, magnesium oxide, calcium phosphate, zirconium oxide, silicon and oxides of silicon, silicon carbide, and iron carbide.

Alternate liquid sprays contemplated include varnish compositions such as chlorotrifluoroethylenepolyvinylidene fluoride copolymer solute in acetone or benzol trifluoride solvent, with silicon carbide, iron carbide, and zinc sulfide solid solution fine particle suspensions as optically active ingredients. The copolymer forms a film upon evaporation of the solvent and the particle suspension performs absorption-reradiation functions. Solar energy ranging from radiation at 0.25 microns through about 2.5 microns is totally absorbed. This energy is reradiated at longer wavelengths ranging from about 0.5 microns through about 12 microns.

In place of the previously recited preferred latex composition in tray 153, the same terpolymer can be made as a varnish liquid composition, in which case the preferred solvent is benzotrifluoride with a solids to total ratio ranging between 20 and 60% solids. Variations in the terpolymer composition, either latex or varnish, include the use of hexafluoropropylene for the polyvinylidene chloride or the substitution of tetrafluoroethylene for the chlorotrifluoroethylene.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Apparatus for making a panel structure of plastic material having a uniform cross-sectional configuration throughout its longitudinal extent and a multiplicity of parallel passages extending longitudinally therethrough defined by a multiplicity of longitudinally extending integrally interconnected exterior and interior thin wall sections, each of said interior thin wall sections defining parts of two adjacent passages, each of said passages being defined at least in part by an interior thin wall section, said apparatus comprising a die having an extrusion outlet defined by a multiplicity of interconnected slots corresponding generally in number and position to said multiplicity of thin wall sections and fluid outlets between interconnected slots of the extrusion outlet corresponding generally in number and position to said passages, means for continuously feeding plastic material to the extrusion outlet of said die at an elevated temperature sufficient to render the plastic material flowable and at a pressure sufficient to cause the heated plastic material to continuously move longitudinally outwardly of said extrusion outlet so that the interconnecting slots thereof form the heated plastic material into said multiplicity of interconnected thin wall sections, means for reducing the temperature of the plastic material moving longitudinally away from said extrusion outlet through the slots defining the exterior thin wall sections by exterior heat exchange while controlling the exterior configuration thereof for a time period sufficient to enable the moving exterior thin wall sections to be self-sustaining, and means for feeding fluid to said fluid outlets so as to cause fluid to flow longitudinally outwardly of said fluid outlets into each passage defined by the thin wall sections moving longitudinally away from said extrusion outlet while controlling the relative fluid pressure acting within adjacent passages on opposite sides of said interior thin wall sections so as to control the position thereof relative to said exterior thin wall sections until the temperature thereof is reduced by heat exchange with said fluid sufficiently to enable said moving interior thin wall sections to be self-sustaining, said die further including separate annular slot-shaped outlets disposed in surrounding relation to certain of said fluid outlets and surrounded relation with the interconnected slots associated therewith and means for continuously feeding a second plastic material to the annular slot-shaped outlets of said die at an elevated temperature sufficient to render the second plastic material flowable and at a pressure sufficient to cause the heated second plastic material associated with each annular slot-shaped outlet to continuously move longitudinally outwardly thereof in a sleeve formation which is expanded outwardly into engagement with the thin wall sections defining the passage within which the sleeve is moving by the associated fluid flowing therein.

2. Apparatus for making a panel structure of plastic material having a uniform cross-sectional configuration throughout its longitudinal extent and a multiplicity of parallel passages extending longitudinally therethrough defined by a multiplicity of longitudinally extending integrally interconnected exterior and interior thin wall sections, each of said interior thin wall sections defining parts of two adjacent passages, each of said passages being defined at least in part by an interior thin wall section, said apparatus comprising a die having an extrusion outlet defined by a multiplicity of interconnected slots corresponding generally in number and position to said multiplicity of thin wall sections and fluid outlets between interconnected slots of the extrusion outlet corresponding generally in number and position to said passages, means for continuously feeding plastic material to the extrusion outlet of said die at an elevated temperature sufficient to render the plastic material flowable and at a pressure sufficient to cause the heated plastic material to continuously move longitudinally outwardly of said extrusion outlet so that the interconnecting slots thereof form the heated plastic material into said multiplicity of interconnected thin wall sections, means for reducing the temperature of the plastic material moving longitudinally away from said extrusion outlet through the slots defining the exterior thin wall sections by exterior heat exchange while controlling the exterior configuration thereof for a time period sufficient to enable the moving exterior thin wall sections to be self-sustaining in said configuration, and means for feeding fluid to said fluid outlets so as to cause fluid to flow longitudinally outwardly of said fluid outlets into each passage defined by the thin wall sections moving longitudinally away from said extrusion outlet while controlling the relative fluid pressure acting within adjacent passages on opposite sides of said interior thin wall sections so as to control the position thereof relative to said exterior thin wall sections until the temperature thereof is reduced by heat exchange with said fluid sufficiently to enable said moving interior thin wall sections to be self-sustaining, said fluid feeding means including first, second and third manifold openings formed in said die, said first manifold opening being communicated with a first series of generally aligned fluid outlets, and second manifold opening being communicated with a second series of generally aligned fluid outlets spaced from said first series of fluid outlets, said third manifold opening communicating with a third series of generally aligned fluid outlets spaced between said first and second series of fluid outlets, first pressure control means for controlling the fluid pressure in said first manifold opening, second pressure control means for controlling the fluid pressure in said second manifold opening, and third pressure control means for controlling the fluid pressure in said third manifold opening.

3. Apparatus as defined in claim 1 wherein said fluid feeding means includes first, second and third manifold openings formed in said die, said first manifold opening being communicated with a first series of fluid outlets, and second manifold opening being communicated with a second series of said fluid outlets, said third manifold opening communicating with a third series of said fluid outlets, first pressure control means for controlling the fluid pressure in said first manifold opening, second pressure control means for controlling the fluid pressure in said second manifold opening, and third pressure control means for controlling the fluid pressure in said third manifold opening.

4. Apparatus as defined in claim 3 or 2 wherein said exterior thin wall section temperature reducing means includes fourth and fifth fluid manifold openings formed in said die, a fourth series of fluid outlets in said die communicating with said fourth manifold opening disposed in said die to direct a flow of fluid therefrom onto the exterior surfaces of the exterior thin wall sections defining the operative exterior of the panel structure, a fifth series of fluid outlets in said die communicating with said fifth manifold opening disposed in said die to direct a flow of fluid thereform onto the exterior surfaces of the exterior thin wall sections opposite from those defining the operative exterior of the panel structure.

5. Apparatus as defined in claim 4 including fourth pressure control means for controlling the fluid pressure in said fourth manifold opening and fifth pressure control means for controlling the fluid pressure in said fifth manifold opening.

6. Apparatus as defined in claim 5 wherein each of said fluid outlets in said fourth series is provided with means for adjusting the rate of flow of fluid therethrough.

7. Apparatus as defined in claim 6 wherein each of said fluid outlets in said fifth series is provided with means for adjusting the rate of flow of fluid therethrough.

8. Apparatus for making a panel structure of plastic material having a uniform cross-sectional configuration throughout its longitudinal extent and a multiplicity of parallel passages extending longitudinally therethrough defined by a multiplicity of longitudinally extending integrally interconnected exterior and interior thin wall sections, each of said interior thin wall sections defining parts of two adjacent passages, each of said passages being defined at least in part by an interior thin wall section, said apparatus comprising a die having an extrusion outlet defined by a multiplicity of interconnected slots corresponding generally in number and position to said multiplicity of thin wall sections and fluid outlets between interconnected slots of the extrusion outlet corresponding generally in number and position to said passages, means for continuously feeding plastic material to the extrusion outlet of said die at an elevated temperature sufficient to render the plastic material flowable and at a pressure sufficient to cause the heated plastic material to continuously move longitudinally outwardly of said extrusion outlet so that the interconnecting slots thereof form the heated plastic material into said multiplicity of interconnected thin wall sections, means for reducing the temperature of the plastic material moving longitudinally away from said extrusion outlet through the slots defining the exterior thin wall sections by exterior heat exchange while controlling the exterior configuration thereof for a time period sufficient to enable the moving exterior thin wall sections to be self-sustaining in said configuration, and means for feeding fluid to said fluid outlets so as to cause fluid to flow longitudinally outwardly of said fluid outlets into each passage defined by the thin wall sections moving longitudinally away from said extrusion outlet while controlling the relative fluid pressure acting within adjacent passages on opposite sides of said interior thin wall sections so as to control the position thereof relative to said exterior thin wall sections until the temperature thereof is reduced by heat exchange with said fluid sufficiently to enable said moving interior thin wall sections to be self-sustaining, said exterior thin wall section temperature reducing means comprising a series of longitudinally spaced pairs of cooperating hollow rollers of a rigid heat conducting material and fluid coolant circulating means for circulating a fluid coolant through said hollow rollers thereby controlling the temperature of said pairs of cooperating rollers so that said temperature reduction and configuration control are effected by direct contact between said rollers and the exterior of said exterior thin wall sections.

9. Apparatus as defined in claim 8 wherein said series of longitudinally spaced pairs of cooperating rollers includes a lower series of rollers and an upper series of rollers, means mounting said upper series of rollers together, and means mounting said upper series of rollers for movement together into and out of cooperating relation with said lower series of rollers.

10. Apparatus as defined in claim 9 wherein the cooperating relationship between said series of upper rollers with respect to said series of lower rollers is one in which the spacing between each cooperating pair of upper and lower rollers progressively diminishes in a direction longitudinally away from said die.

11. Apparatus as defined in claim 10 wherein said lower roller mounting means comprises a pair of parallel lower side plates each rotatably receiving an end of each lower roller and means mounting said lower side plates for simultaneous vertical adjustment.

12. Apparatus for making a panel structure of plastic material having a uniform cross-sectional configuration throughout its longitudinal extent and a multiplicity of parallel passages extending longitudinally therethrough defined by a multiplicity of longitudinally extending integrally interconnected exterior and interior thin wall sections, each of said interior thin wall sections defining parts of two adjacent passages, each of said passages being defined at least in part by an interior thin wall section, said apparatus comprising a die having an extrusion outlet defined by a multiplicity of interconnected slots corresponding generally in number and position to said multiplicity of thin wall sections and fluid outlets between interconnected slots of the extrusion outlet corresponding generally in number and position to said passages, means for continuously feeding plastic material to the extrusion outlet of said die at an elevated temperature sufficient to render the plastic material flowable and at a pressure sufficient to cause the heated plastic material to continuously move longitudinally outwardly of said extrusion outlet so that the interconnecting slots thereof form the heated plastic material into said multiplicity of interconnected thin wall sections, means for reducing the temperature of the plastic material moving longitudinally away from said extrusion outlet through the slots defining the exterior thin wall sections by exterior heat exchange while controlling the exterior configuration thereof for a time period sufficient to enable the moving exterior thin wall sections to be self-sustaining in said configuration, and means for feeding fluid to said fluid outlets so as to cause fluid to flow longitudinally outwardly of said fluid outlets into each passage defined by the thin wall sections moving longitudinally away from said extrusuion outlet while controlling the relative fluid pressure acting within adjacent passages on opposite sides of said interior thin wall sections so as to control the position thereof relative to said exterior thin wall section until the temperature thereof is reduced by heat exchange with said fluid sufficiently to enable said movement interior thin wall sections to be self-sustaining, said series of longitudinally spaced pairs of cooperating rollers including a lower series of rollers and an upper series of rollers, means mounting said upper series of rollers together, and means mounting said upper series of rollers for movement together into and out of cooperating relation with said lower series of rollers, the cooperating relationship between said series of upper rollers with respect to said series of lower rollers being one in which the spacing between each cooperating pair of upper and lower rollers progressively diminishes in a direction longitudinally away from said die, said lower roller mounting means comprising a pair of parallel lower side plates each rotatably receiving an end of each lower roller and means mounting said lower side plates for simultaneous vertical adjustment, said upper roller mounting means comprising a pair of parallel upper side plates each rotatably receiving an end of each upper roller, pivot means between said upper and lower side plates, spring means resiliently biasing said upper side plates to pivot about said pivot means in a direction to move said upper rollers out of relation with said lower rollers and adjustable means between said upper and lower side plates for securing said upper and lower side plates in an operative position against the bias of said spring means wherein said upper and lower rollers are in said cooperative relation.

13. Apparatus as defined in claim 12 wherein said adjustable means includes releasable means for rapidly releasing the securement of said upper side plates in said operative position.

14. Apparatus as defined in claim 13 wherein said adjustable means includes a threaded stem having an annular groove therein and said releasable means includes a pin releasably engaged within said annular groove.

15. Apparatus for making a panel structure of plastic material having a uniform cross-sectional configuration throughout its longitudinal extent and multiplicity of parallel passages extending longitudinally therethrough defined by a multiplicity of longitudinally extending integrally interconnected exterior and interior thin wall sections, each of said interior thin wall sections defining parts of two adjacent passages, each of said passages being defined at least in part by an interior thin wall section, said apparatus comprising a die having an extrusion outlet defined by a multiplicity of interconnected slots corresponding generally in number and position to said multiplicity of thin wall sections and fluid outlets between interconnected slots of the extrusion outlet corresponding generally in number and position to said passages, means for continuously feeding plastic material to the extrusion outlet of said die at an elevated temperature sufficient to render the plastic material flowable and at a pressure sufficient to cause the heated plastic material to continuously move longitudinally outwardly of said extrusion outlet so that the interconnecting slots thereof form the heated plastic material into said multiplicity of interconnected thin wall sections, means for reducing the temperature of the plastic material moving longitudinally away from said extrusion outlet through the slots defining the exterior thin wall sections by exterior heat exchange while controlling the exterior configuration thereof for a time period sufficient to enable the moving exterior thin wall sections to be self-sustaining in said configuration, and means for feeding fluid to said fluid outlets so as to cause the fluid to flow longitudinally outwardly of said fluid outlets into each passage defined by the thin wall sections moving longitudinally away from said extrusion outlet while controlling the relative fluid pressure acting within adjacent passages on opposite sides of said interior thin wall sections so as to control the position thereof relative to said exterior thin wall sections until the temperature thereof is reduced by heat exchange with said fluid sufficiently to enable said moving interior thin wall sections to be self-sustaining, said exterior thin wall section temperature reducing means comprising a series of longitudinally spaced pairs of cooperating hollow rollers of a rigid heat conducting material and fluid coolant circulating means for circulating a fluid coolant through said hollow rollers thereby controlling the temperature of said pairs of cooperating rollers so that said temperature reduction and configuration control are effected by direct contact between said rollers and the exterior of said exterior thin wall sections, said series of longitudinally spaced pairs of cooperating rollers including a lower series of rollers and an upper series of rollers, means mounting said upper series of rollers together, and means mounting said upper series of rollers for movement together into and out of cooperating relation with said lower series of rollers, said fluid coolant circulating means including a lower hollow manifold block for receiving fluid coolant from a supply, a rotary coupling communicating an adjacent end of each lower roller with said lower manifold block, a separate upper hollow manifold block for receiving fluid coolant from a supply, and a rotary coupling communicating the adjacent end of each upper roller with each upper manifold block.

16. Apparatus as defined in claim 9 including means for drivingly rotating said lower series of rollers in the same direction corresponding to the direction of longitudinal movement of the panel structure and said upper series of rollers in an opposite direction.

17. Apparatus as defined in claim 1, 3, 8, 9, 10, 11 12, or 2 wherein said exterior thin wall section temperature reducing means includes a sprayer assembly for spraying a liquid composition on the exterior surface of the exterior thin wall sections opposed to those defining the operative exterior of the panel structure so that said liquid composition forms a radiant energy absorbing and reradiating coating thereon.

18. Apparatus as defined in claim 8, 9, 10, 11 or 12 wherein said exterior thin wall section temperature reducing means further includes a liquid composition containing tray positioned beneath a lower roller so as to supply liquid composition to the periphery of said roller which is transferred to the exterior thin wall section contacted thereby.

* * * * *